United States Patent
Kopti

(10) Patent No.: US 9,137,854 B2
(45) Date of Patent: Sep. 15, 2015

(54) CLOUD-BASED WAN MANAGEMENT

(75) Inventor: Juzer T. Kopti, Ashburn, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 707 days.

(21) Appl. No.: 13/446,346

(22) Filed: Apr. 13, 2012

(65) Prior Publication Data
US 2013/0276090 A1 Oct. 17, 2013

(51) Int. Cl.
*G06F 21/00* (2013.01)
*H04W 88/16* (2009.01)

(52) U.S. Cl.
CPC ..................................... *H04W 88/16* (2013.01)

(58) Field of Classification Search
CPC ............................... H04W 88/16; H04W 88/00
USPC ............................................................ 726/11
See application file for complete search history.

(56) References Cited

U.S. PATENT DOCUMENTS

| | | | |
|---|---|---|---|
| 7,882,538 B1 * | 2/2011 | Palmer ............................. 726/1 |
| 2007/0140235 A1 * | 6/2007 | Aysan et al. ................... 370/389 |
| 2011/0075667 A1 * | 3/2011 | Li et al. .......................... 370/392 |
| 2012/0303835 A1 * | 11/2012 | Kempf et al. ................. 709/235 |
| 2013/0250951 A1 * | 9/2013 | Koganti ......................... 370/390 |

\* cited by examiner

Primary Examiner — William Goodchild

(57) ABSTRACT

A method, performed by a network device, may include generating a virtual Layer 3 device for a customer's network. The method may further include establishing a Layer 2 connection between the customer's network and the generated virtual Layer 3 device; establishing a Layer 3 connection between the generated virtual Layer 3 device and a Layer 3 network; and configuring the generated virtual Layer 3 device to function as an edge router for the customer's network.

28 Claims, 13 Drawing Sheets

CLOUD-BASED WAN MANAGEMENT

BACKGROUND INFORMATION

A customer of a provider of communication services may maintain multiple sites. For example, a company may maintain remote sites in multiple cities. Each remote site may be associated with a Local Area Network (LAN). The customer may require access to the Internet and/or may require communication between the LANs. The provider of communication services may provide Internet Protocol (IP) connectivity to the LANs and may enable secure communication between the LANs by establishing a Virtual Private Network (VPN) across an IP network. In order for a LAN to connect to an IP network, such as the Internet, the customer may need to purchase a Customer Edge (CE) router. If the customer maintains a large number of sites, the customer may need to purchase a large number of CE routers, resulting in high operating costs.

DETAILED DESCRIPTION OF PREFERRED EMBODIMENTS

Figure 1A:
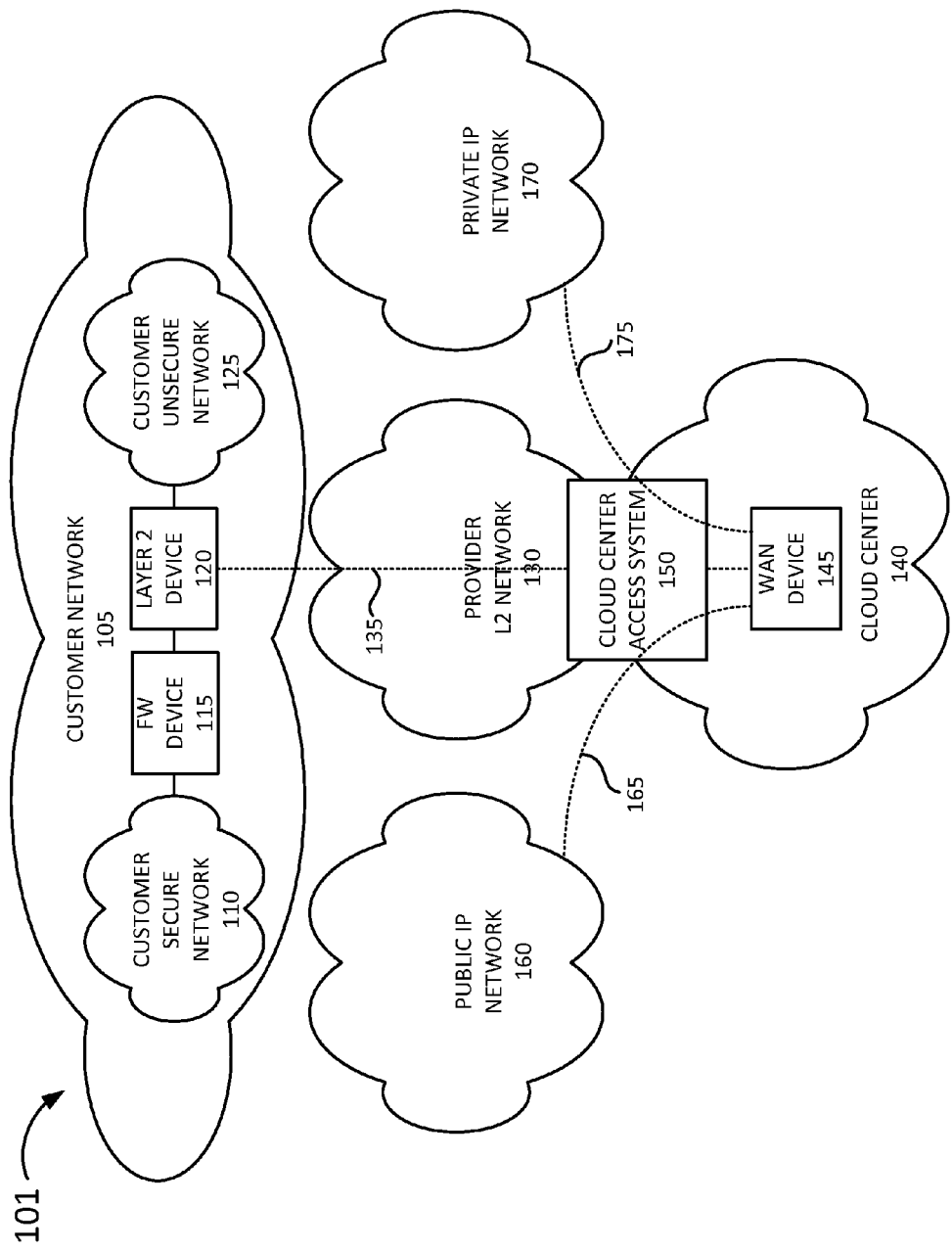
FIG. 1A is a diagram illustrating a first exemplary environment according to an implementation described herein.

The following detailed description refers to the accompanying drawings. The same reference numbers in different drawings identify the same or similar elements.

An implementation described herein may relate to cloud-based Wide Area Network (WAN) management. A customer's WAN may include one or more Local Area Networks (LANs) associated with the customer. Each LAN may be connected to a cloud center over a Layer 2 connection via a cloud center access system. In one example, the Layer 2 connection may be implemented as a direct Layer 2 connection through a provider's Layer 2 network. In another example, the Layer 2 connection may be implemented via a tunnel, such as a Generic Encapsulation (GRE) tunnel or an Internet Protocol Security (IPSec) tunnel, across a Layer 3 network, such as a public Internet Protocol (IP) network or a private IP network. In the Open Systems Interconnection (OSI) model, Layer 2 may correspond to the data link layer, which may govern the exchange of data between network devices on a same network, and Layer 3 may correspond to the network layer, which may govern routing of data units across one or more network. A common Layer 2 architecture, associated with Local Area Networks (LANs), is based on the Ethernet technologies. Devices on an Ethernet network may exchange data using data units known as Ethernet frames. A common Layer 3 architecture is based on IP networks.

The cloud center may include a WAN device that may generate a virtual Layer 3 device for a particular LAN associated with the customer. The virtual Layer 3 device may be configured to function as an edge router for the particular LAN. For example, the virtual Layer 3 device may include an instance of an operating system for the edge router and/or may include a routing table for the particular LAN. The virtual Layer 3 device may provide a connection to a Layer 3 network (e.g., a public IP network such as the Internet), via the cloud center access system.

The use of virtual Layer 3 devices may enable a customer to manage a WAN that includes multiple customer networks (e.g., multiple LANs). For example, a virtual Layer 3 device may be generated for each of the multiple LANs, a policy or service may be obtained for the WAN, one or more criteria may be obtained for the policy or service, and virtual Layer 3 devices associated with LANs that match the one or more criteria may be configured for the obtained policy or service. Thus, multiple LANs may be configured without the need to purchase edge router devices for each LAN. Furthermore, the virtual Layer 3 devices may be updated without having to purchase new hardware.

Moreover, a virtual Layer 3 device may be configured to provide one or more threat management services for a customer's network. Threat management services may include, for example, a firewall service, an intrusion detection and prevention service, a denial of service attack detection and mitigation service, an antivirus service, a data loss prevention service, and/or a traffic reporting service. Furthermore, a virtual Layer 3 device may be configured to provide one or more WAN optimization services for the customer's network. WAN optimization services may include, for example, a protocol spoofing service, a latency optimization service, a data deduplication service, a data compression service, and/or a traffic shaping service. Furthermore, a virtual Layer 3 device may be configured to provide one or more wireless LAN services to manage wireless devices associated with a customer's network.

FIG. 1A is a diagram of a first exemplary environment 101 in which the systems and/or methods described herein may be implemented. Environment 101 illustrates an implementation wherein a Layer 2 connection between a customer network and a cloud center is provided via a provider Layer 2 network. As shown in FIG. 1A, environment 101 may include a customer network 105, a provider Layer 2 (L2) network 130, a cloud center 140, a cloud center access system 150, a public IP network 160, and a private IP network 170. While FIG. 1A shows a single customer network 105, a single provider Layer 2 network 130, a single cloud center 140, a single cloud center access system 150, a single public IP network 160, and a single private IP network 170 for illustrative purposes, in practice, environment 101 may include multiple customer networks 105, multiple provider Layer 2 networks 130, multiple cloud centers 140, multiple cloud center access systems 150, multiple public IP network 160, or multiple private IP networks 170. In particular, a customer may be associated with multiple customer networks 105 and the multiple customer networks 105 may correspond to the customer's WAN.

Customer network 105 may include a LAN associated with a particular customer. Customer network 105 may include a customer secure network 110, a firewall (FW) device 115, a Layer 2 device 120, and a customer unsecure network 125. Customer secure network 110 may include a Layer 2 network, such as an Ethernet LAN, that is secured by firewall device 115. Firewall device 115 may include a Layer 2 device that performs firewall functions for customer secure network 110.

Layer 2 device 120 may include any device capable of processing and forwarding data at the data link layer. For example, Layer 2 device 120 may include a switch, a multi-port bridge, a Layer 2 firewall, or another type of Layer 2 device. Layer 2 device 120 may receive a data unit at a particular input port, may determine a particular output port for the data unit, and may forward the data unit via the output port.

Customer unsecure network 125 may include a Layer 2 network that is not protected by firewall device 115. For example, customer unsecure network 125 may include a demilitarized zone (DMZ) that includes public server devices that may be accessed over public IP network 160.

Provider Layer 2 network 130 may include a Layer 2 network, such as an Ethernet network, that may provide a Layer 2 connection between Layer 2 device 120 and cloud center access system 150 via Layer 2 connection 135.

Cloud center 140 may include one or more server devices and/or storage devices, which provide cloud services for customers. The one or more server devices and/or storage devices may connect to cloud center access system 150 with a Layer 2 connection or with a Layer 3 connection. Cloud services provided by cloud center 140 may include, for example, computing as a service, cloud storage, a hosted voice-over-Internet Protocol (VoIP) service, a Network Address Translation (NAT) service, a Virtual Private Network (VPN) service, a Distributed Denial of Service (DDOS) detection and/or mitigation service, a firewall service, an Intrusion Detection and Prevention System (IDPS), an email filtering service, a filtering service for a particular web site, a load balancing service, a video distribution service, a lawful intercept service on behalf of a law enforcement entity, and/or any other type of service that be provided by a cloud center.

Cloud center 140 may include a WAN device 145. While FIG. 1A illustrates a single WAN device 145 for illustrative purposes, in practice, cloud center 140 may include multiple WAN devices 145. WAN device 145 may include one or more devices that provide one or more services for a customer's WAN. For example, WAN device 145 may generate a virtual Layer 3 device for each customer network 105 associated with a particular customer. Thus, if a customer owns ten different customer networks 105, WAN device 145 may include ten virtual Layer 3 devices. Each virtual Layer 3 device may function as a Layer 3 edge router for a particular customer network 105. Furthermore, a particular virtual Layer 3 device may provide one or more of threat management services, WAN optimization services, and/or wireless LAN management services.

WAN device 145 may provide a public IP connection 165 to public IP network 160 and/or a private IP connection 175 to private IP network 170 via cloud center access system 150. For example, a virtual Layer 3 device on WAN device 145 may receive a Layer 2 data unit (e.g., Ethernet frame) from Layer 2 device 120 via Layer 2 connection 135, may generate a Layer 3 data unit (e.g., packet) from the Layer 2 data unit, may determine a next hop destination for the generated Layer 3 data unit, and may forward the Layer 3 data unit to the next hop destination via public IP connection 165 or a private IP connection 175. As another example, a virtual Layer 3 device on WAN device 145 may receive a Layer 3 data unit via public IP connection 165 or a private IP connection 175, may retrieve a Layer 2 data unit from the received Layer 3 data unit, and may forward the retrieved Layer 2 data unit to Layer 2 device 120 over Layer 2 connection 135.

Cloud center access system 150 may include one or more devices that connect cloud center 140 to provider Layer 2 network 130, to public IP network 160, and/or to private IP network 170. Cloud center access system 150 may include one or more network devices that function as Layer 2 and/or Layer 3 devices and that maintain Layer 2 and/or Layer 3 separation for different customers. Layer 2 separation may correspond to maintaining Layer 2 traffic associated with a first customer separate from Layer 2 traffic associated with a second customer. Layer 3 separation may correspond to maintaining Layer 3 traffic associated with a first customer separate from Layer 3 traffic associated with a second customer.

Cloud center access system 150 may perform Layer 2 separation by generating a separate Layer 2 domain (L2D) for each customer. An L2D may associate a particular interface and a particular L2D tag with the customer. An L2D tag may include, for example, one or more Institute for Electrical and Electronics Engineers (IEEE) 802.1Q Virtual LAN (VLAN) identifiers. For example, a data unit may include an L2D tag and may be received via a particular interface assigned to the L2D. The data unit may be identified as being associated with the L2D based on being received via the particular interface and based on including the L2D tag. Furthermore, cloud center access system 150 may enable different customer networks, associated with a customer, to communicate with each other using Layer 2 connections 135.

Public IP network 160 may include a public IP packet-switched network, a circuit-switched network, or a combination thereof. For example, public IP network 160 may include a local area network (LAN), a wide area network (WAN), a metropolitan area network (MAN), an ad hoc network, an intranet, a fiber optic-based network (e.g., a fiber optic service network), a wireless network (e.g., a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of thereof), and/or a combination of these or other types of networks. Private IP network 170 may include a private IP packet-switched network, a private circuit-switched network, or a combination thereof.

Figure 1B:
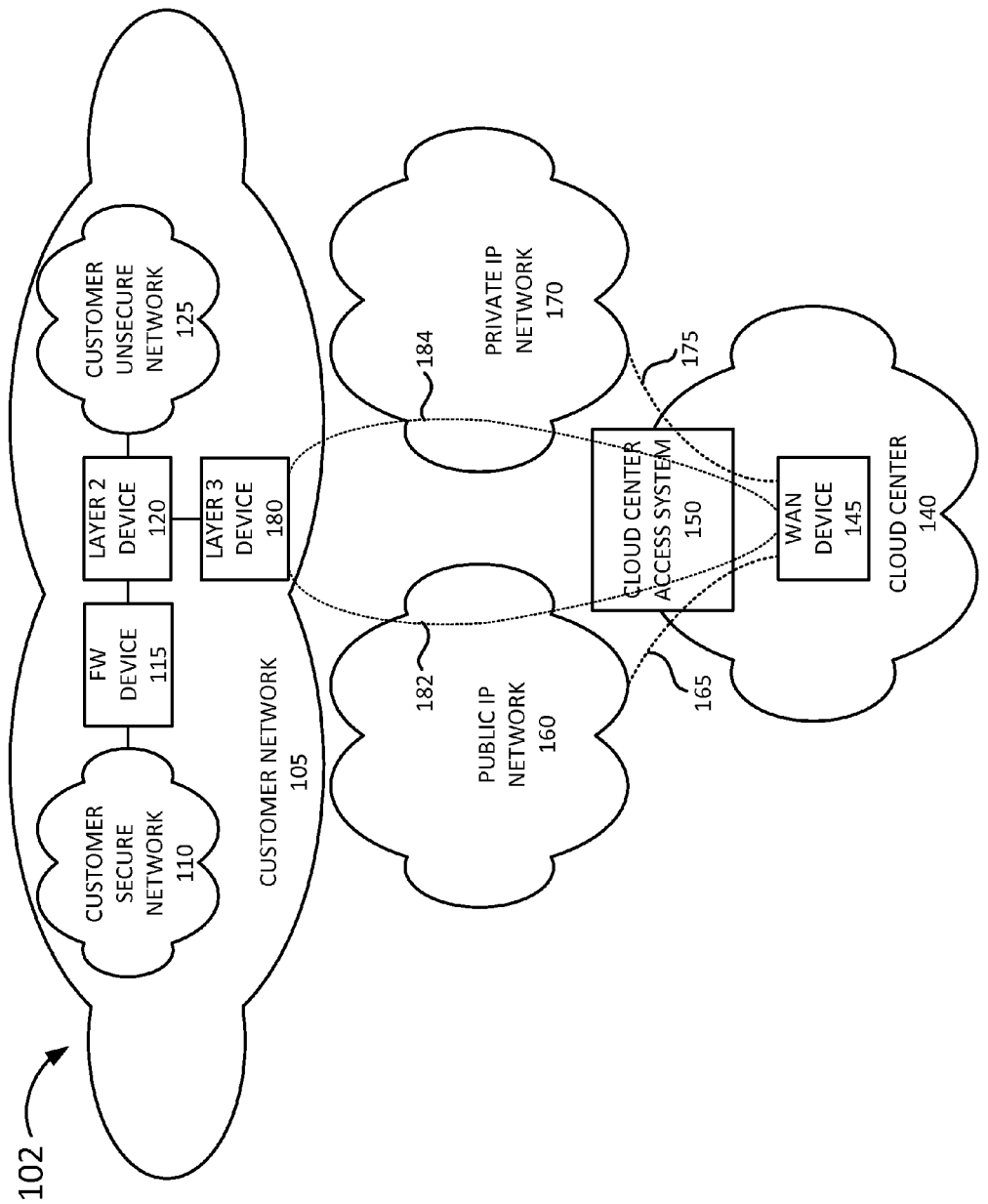
FIG. 1B is a diagram illustrating a second exemplary environment according to an implementation described herein.

FIG. 1B is a diagram of a second exemplary environment 102 in which the systems and/or methods described herein may be implemented. Environment 102 illustrates an implementation wherein a Layer 2 connection between a customer network and a cloud center is implemented via a Layer 3 network. As shown in FIG. 1B, environment 102 may include customer network 105, cloud center 140, cloud center access system 150, public IP network 160, and private IP network 170.

Customer network 105 may include customer secure network 110, firewall device 115, Layer 2 device 120, customer unsecure network 125, and a Layer 3 device 180. Layer 3 device 180 may include one or more devices capable of processing and forwarding data at the network layer. For example, Layer 3 device 180 may include a router, a gateway, a Layer 3 firewall, and/or another type of Layer 3 device. Layer 3 device 180 may receive a Layer 2 data unit (e.g., an Ethernet frame) from Layer 2 device 120, may encapsulate the Layer 2 data unit in a Layer 3 data unit (e.g., an IP packet), and may forward the Layer 3 data unit to a destination via public IP network 160 or private IP network 170. Layer 3 device 180 may receive a Layer 3 data unit from public IP network 160 or private IP network 170, may retrieve a Layer 2 data unit from the received Layer 3 data unit, and may forward the Layer 2 data unit to Layer 2 device 120.

Layer 3 device 180 may be configured for a Layer 2 connection to cloud center access system 150 via public IP tunnel 182 or via private IP tunnel 184. Public IP tunnel 182 or private IP tunnel 184 may be implemented, for example, using a GRE tunnel, an IPSec tunnel, or another type of tunnel. Public IP tunnel 182 or private IP tunnel 184 may function as a Layer 2 Virtual Private Network (VPN) connection between customer network 105 and cloud center 140.

Although FIGS. 1A and 1B show exemplary components of environment 101 and environment 102, in other implementations, environment 101 or environment 102 may include fewer components, different components, differently arranged components, or additional components than depicted in FIG. 1A or 1B. Additionally or alternatively, one or more components of environment 101 or environment 102 may perform functions described as being performed by one or more other components of environment 101 or environment 102.

Figure 2:
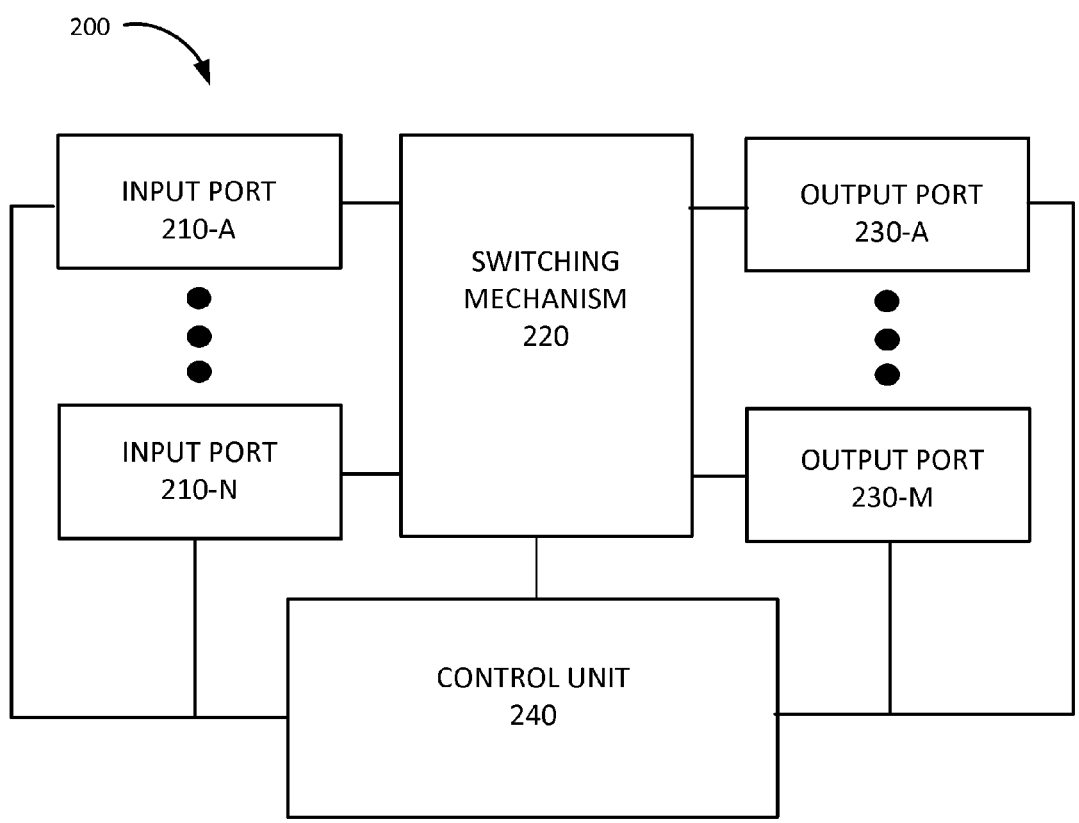
FIG. 2 is a diagram illustrating exemplary components of the Layer 2 device or the Layer 3 device of FIG. 1A or 1B.

FIG. 2 is a diagram illustrating example components of device 200. Firewall device 115, Layer 2 device 120, cloud center access system 150, and/or Layer 3 device 180 may each include one or more devices 200. As shown in FIG. 2, device 200 may include one or more input ports 210-A to 210-N (referred to herein individually as "input port 210" and collectively as "input ports 210"), a switching mechanism 220, one or more output ports 230-A to 230-M (referred to herein individually as "output port 230" and collectively as "output ports 230"), and/or a control unit 240.

Input ports 210 may be the points of attachments for physical links and may be the points of entry for incoming traffic. An input port 210 may be associated with an interface card. Input port 210 may perform some or all of data plane processing associated with an incoming packet. Data plane processing may encompass looking up a destination address for an incoming packet, removing or changing a label associated with the packet, determining a path through switching mechanism 220, and/or filter the packet based on one or more firewall filters.

Switching mechanism 220 may include one or more switching planes and/or fabric cards to facilitate communication between input ports 210 and output ports 230. In one implementation, each of the switching planes and/or fabric cards may include a single or multi-stage switch of crossbar elements. In another implementation, each of the switching planes may include some other form(s) of switching elements. Additionally or alternatively, switching mechanism 220 may include one or more processors, one or more memories, and/or one or more paths that permit communication between input ports 210 and output ports 230.

Output ports 230 may store traffic received from input ports 210 and may schedule the traffic on one or more output physical links. An output port 230 may be associated with an interface card. Output port 230 may perform some or all of data plane processing associated with an outgoing packet. For example, output port 230 may classify the packet based on a quality of service class, schedule the packet in a particular queue, add or change a label associated with the packet, and/or filter the packet based on one or more firewall filters.

Control unit 240 may interconnect with input ports 210, switching mechanism 220, and/or output ports 230 and may control operation of device 200. For example, control unit 240 may perform control plane operations associated with device 200 (e.g., control unit 240 may use routing protocols and may create one or more routing tables and/or one or more forwarding tables that are used in traffic forwarding).

Although FIG. 2 shows example components of device 200, in other implementations, device 200 may include fewer components, different components, differently arranged components, and/or additional components than depicted in FIG. 2. Additionally or alternatively, one or more components of device 200 may perform one or more tasks described as being performed by one or more other components of device 200.

Figure 3:
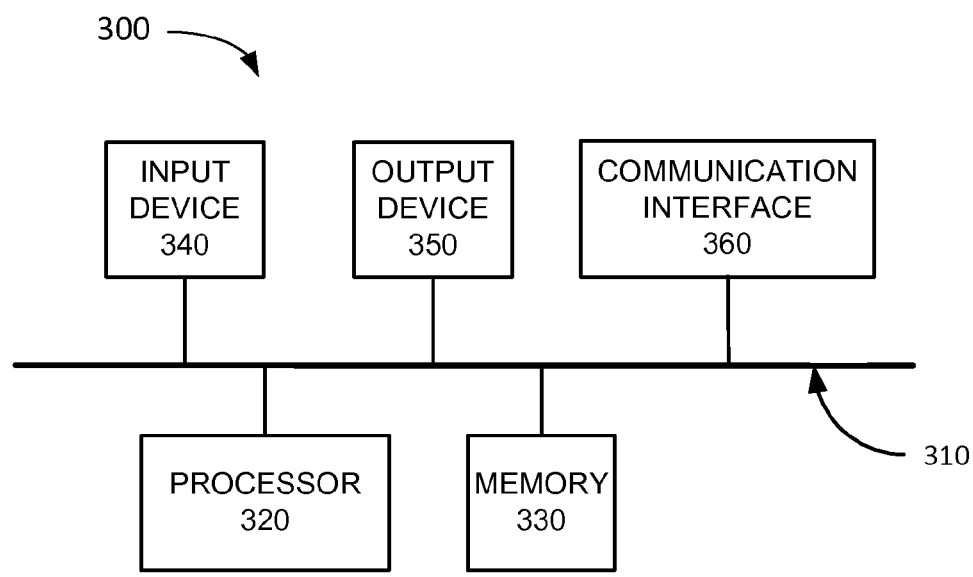
FIG. 3 is a diagram illustrating exemplary components of a device that may be included in one or more components of FIG. 1A or 1B.

FIG. 3 is a diagram illustrating exemplary components of a device 300 according to an implementation described herein. Firewall device 115, Layer 2 device 120, Layer 3 device 180, cloud center access system 150, WAN device 145, and/or control unit 240 of device 200 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying information. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a WiFi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to configuring a virtual L3 device and/or performing the functionality of a virtual L3 device. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
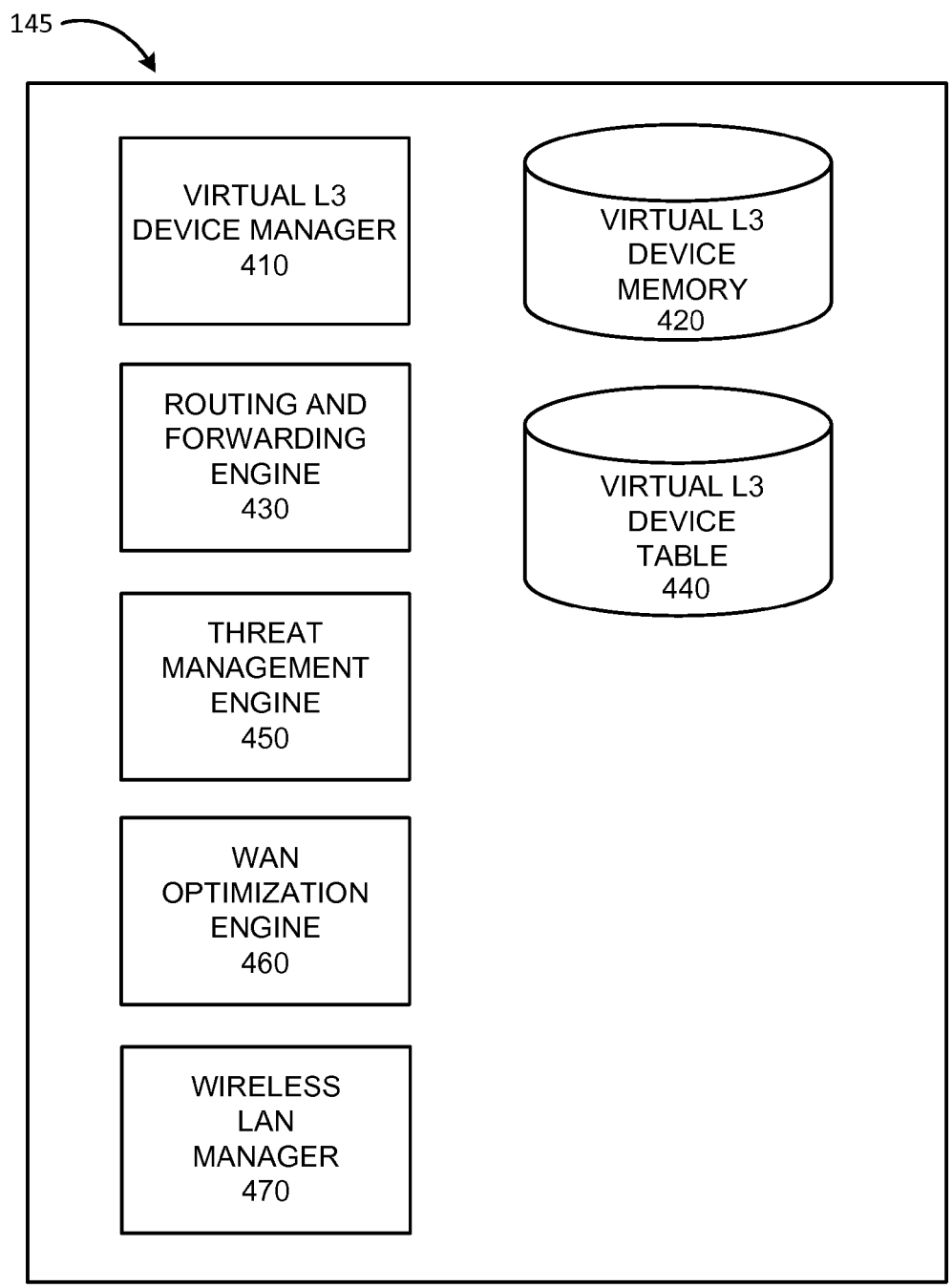
FIG. 4 is a diagram illustrating exemplary functional components of the Wide Area Network (WAN) device of FIG. 1A or 1B.

FIG. 4 is a diagram of exemplary functional components of WAN device 145. The functional components of WAN device 145 may be implemented, for example, via processor 320 executing instructions from memory 330. Alternatively, some or all of the functional components of FIG. 4 may be hardwired. As shown in FIG. 4, WAN device 145 may include a virtual Layer 3 device manager 410, a virtual Layer 3 device memory 420, a routing and forwarding engine 430, a virtual Layer 3 device table 440, a threat management engine 450, a WAN optimization engine 460, and a wireless LAN manager 470.

Virtual Layer 3 device manager 410 may manage virtual Layer 3 devices associated with a customer. For example, virtual Layer 3 device manager 410 may generate a virtual Layer 3 device for customer network 105. Moreover, virtual Layer 3 device manager 410 may configure one or more virtual Layer 3 devices associated with a customer. For example, virtual Layer 3 device manager 410 may obtain a policy or service associated with a customer's WAN and may apply the policy or service to virtual Layer 3 devices associated with the customer networks 105, wherein the customer networks 105 include the customer's WAN.

Virtual Layer 3 device memory 420 may store information associated with particular virtual Layer 3 devices. Exemplary information that may be stored in virtual Layer 3 device memory 420 is described below with reference to FIG. 5.

Routing and forwarding engine 430 may route data units based on a routing and/or forwarding table associated with a particular virtual Layer 3 device. For example, in one implementation, routing and forwarding engine 430 may identify a particular routing and/or forwarding table associated with a particular virtual Layer 3 device and may route a data unit associated with the particular virtual Layer 3 device based on the identified routing and/or forwarding table. In another implementation, each virtual Layer 3 device may run a separate instance of a routing and forwarding engine 430.

Routing and forwarding engine 430 may receive a data unit via an interface, may identify a Layer 2 domain associated with the data unit, may identify a virtual Layer 3 device associated with the Layer 2 domain, may access a routing and/or forwarding table associated with the identified virtual Layer 3 device, may determine an output interface based on the destination address included in the data unit in the accessed routing and/or forwarding table, and may forward the data unit via the determined output interface.

Virtual Layer 3 device table 440 may store information that may be used to identify a particular virtual Layer 3 device with a particular data unit. For example, virtual Layer 3 device table 440 may store a table that relates a particular IP address with a particular virtual Layer 3 device. When WAN device 145 receives a packet from public IP network 160 or from private IP network 170, routing and forwarding engine 430 may retrieve a destination IP address from the packet, and may access virtual Layer 3 device table 440 to identify a virtual Layer 3 device associated with the retrieved destination IP address.

Threat management engine 450 may apply one or more threat management policies to data units being processed by a particular virtual Layer 3 device. For example, in one implementation, thread management engine 450 may identify one or more threat management policies, such as a firewall filter, associated with the particular virtual Layer 3 device by accessing virtual Layer 3 device memory 420 and may apply the identified one or more threat management policies to data units associated with the particular virtual Layer 3 device. In another implementation, each virtual Layer 3 device that is configured for threat management services may run a separate instance of a threat management engine 450.

WAN optimization engine 460 may apply one or more WAN optimization policies to data units being processed by a particular virtual Layer 3 device. For example, in one implementation, WAN optimization engine 460 may identify one or more WAN optimization policies, such as a protocol spoofing policy, associated with the particular virtual Layer 3 device by accessing virtual Layer 3 device memory 420 and may apply the identified one or more WAN optimization policies to data units associated with the particular virtual Layer 3 device. In another implementation, each virtual Layer 3 device that is configured for WAN optimization services may run a separate instance of a WAN optimization engine 460.

Wireless LAN manager 470 may apply one or more wireless LAN management policies to a wireless LAN associated a customer network 105 associated with a particular virtual Layer 3 device. For example, in one implementation, wireless LAN manager 470 may identify one or more wireless LAN management policies, such as a policy to apply a particular rate limit to wireless devices associated with the wireless LAN, associated with the particular virtual Layer 3 device by accessing virtual Layer 3 device memory 420 and may apply the identified one or more wireless LAN management policies to data units associated with the particular virtual Layer 3 device. In another implementation, each virtual Layer 3 device that is configured for wireless LAN management services may run a separate instance of a wireless LAN manager 470.

Although FIG. 4 shows exemplary functional components of WAN device 145, in other implementations, WAN device 145 may include fewer functional components, different functional components, differently arranged functional components, or additional functional components than depicted in FIG. 4. Additionally or alternatively, one or more functional components of WAN device 145 may perform functions described as being performed by one or more other functional components of WAN device 145.

Figure 5:
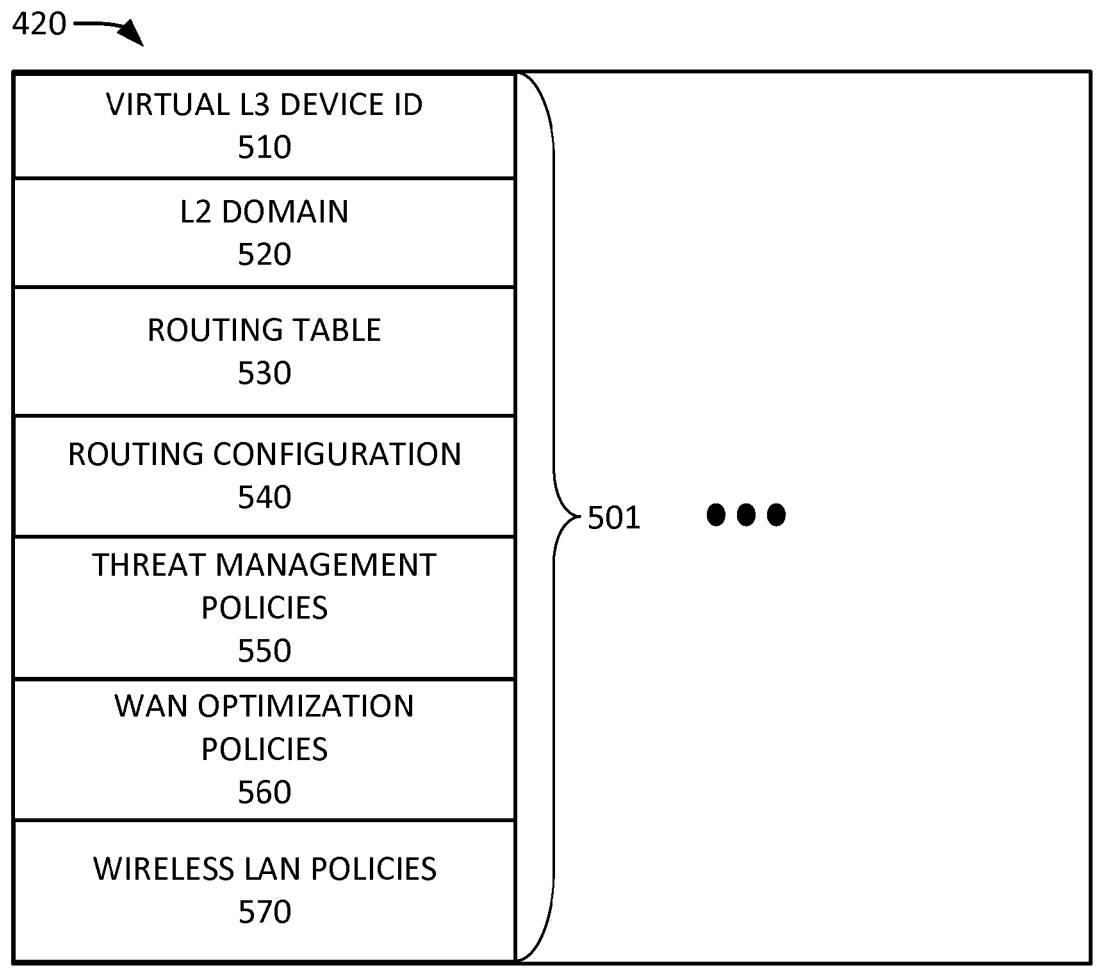
FIG. 5 is a diagram of exemplary components that may be stored in the virtual Layer 3 device memory of FIG. 4.

FIG. 5 is a diagram illustrating exemplary components that may be stored in virtual Layer 3 device memory 420. As shown in FIG. 5, virtual Layer 3 device memory 420 may include one or more virtual Layer 3 device records 501 (referred to herein collectively as "virtual Layer 3 device records 501" and individually as "virtual Layer 3 device record 501"). Virtual Layer 3 device record 501 may include a virtual Layer 3 device identifier (ID) field 510, a Layer 2 domain field 520, a routing table field 530, a routing configuration field 540, a threat management policies field 550, a WAN optimization policies field 560, and a wireless LAN policies field 570.

Virtual Layer 3 device ID field 510 may include an identifier that uniquely identifies a particular virtual Layer 3 device. Layer 2 domain field 520 may identify a particular Layer 2 domain associated with the particular virtual Layer 3 device.

Routing table field 530 may store, or point to, a routing table associated with the particular virtual Layer 3 device. For example, routing table field 530 may relate particular destination IP addresses with particular output ports 230. Routing configuration field 540 may store information about one or more configurations associated with the particular virtual Layer 3 device. As an example, routing configuration field 540 may store a configuration associated with a routing protocol, such as a Border Gateway Protocol (BGP) configuration. As another example, routing configuration field 540 may store a configuration associated with a particular interface. Furthermore, routing configuration field 540 may store one or more routing policies associated with the particular virtual Layer 3 device. For example, a routing policy may bypass a routing table to identify a next hop destination for a data unit if the data unit matched a condition associated with the routing policy.

Threat management policies field 550 may store information about one or more threat management policies associated with the particular virtual Layer 3 device. For example, threat management policies field 550 may store one or more firewall configurations associated with the particular virtual Layer 3 device. A firewall policy may include a match condition and an action, and the action may be applied to a data unit if the match condition is determined to be true for the data unit. For example, firewall policy may instruct to drop packets associated with a particular source IP address.

As another example, threat management policies field 550 may include an intrusion detection and prevention service policy. An intrusion detection and prevention service may analyze data units for patterns associated with identified security threats and may provide a warning, quarantine, delete, or otherwise act upon data units associated with an identified security threat. As yet another example, threat management policies field 550 may include a denial of service attack detection and/or mitigation service policy. A denial of service detection service may detect denial of service attacks and a denial of service mitigation service may mitigate denial of service attacks by dropping data units that are detected as being part of a denial of service attack.

As yet another example, threat management policies field 550 may include an antivirus service policy that may monitor data units for patterns associated with identified viruses. As yet another example, threat management policies field 550 may include a data loss prevention service policy. A data loss prevention service may monitor data units for patterns associated with sensitive data (e.g., particular key words or phrases). Data units having patterns that are associated with the sensitive data may not be allowed to leave customer network 105. As yet another example, threat management policies field 550 may include a traffic reporting service policy. A traffic reporting service may collect statistics about data units associated with a particular virtual Layer 3 device.

WAN optimization policies field 560 may store information about one or more WAN optimization policies associated with the particular virtual Layer 3 device. As an example, WAN optimization policies field 560 may include a protocol spoofing service policy. A protocol spoofing service may make a particular protocol more efficient by, for example, bundling messages associated with particular applications, applying a slow-start algorithm to data being transmitted, and/or applying another technique to improve the performance of a particular protocol. As another example, WAN optimization policies field 560 may include a data deduplication service policy. A data deduplication service policy may reduce the transfer of duplicate data by sending a reference to data that has been previously sent. As yet another example, WAN optimization policies field 560 may include a latency optimization service policy. A latency optimization service may provide refinements in the latency associated with the exchange of control packets by, for example, sending an acknowledgement message or responding to a request locally, rather than forwarding the request to a destination. As yet another example, WAN optimization policies field 560 may include a data compression service policy. A data compression service may use a compression algorithm on data prior to transmission. As yet another example, WAN optimization policies field 560 may include a traffic shaping service. A traffic shaping service may apply a rate limiting policy to particular types of data units in order to increase bandwidth for other types of data units.

Wireless LAN policies field 570 may store information about one or more wireless LAN policies associated with the particular virtual Layer 3 device. As an example, wireless LAN policies field 570 may include a wireless device security service policy. A wireless device security service may apply a security service, such as a firewall and/or authentication and authorization service, to particular wireless devices associated with a wireless LAN. As another example, wireless LAN policies field 570 may include a wireless device data rate management service policy. A wireless device data rate management service may manage a data rate associated with a particular wireless device. As yet another example, wireless LAN policies field 570 may include a wireless device bandwidth management service policy. A wireless device bandwidth management service may manage a bandwidth associated with a particular wireless device. As yet another example, wireless LAN policies field 570 may include a wireless device traffic reporting service policy. A wireless device traffic reporting service may collect statistics about data associated with a particular wireless device.

Although FIG. 5 shows exemplary components of virtual Layer 3 device memory 420, in other implementations, virtual Layer 3 device memory 420 may include fewer components, different components, differently arranged components, or additional components than depicted in FIG. 5.

Figure 6:
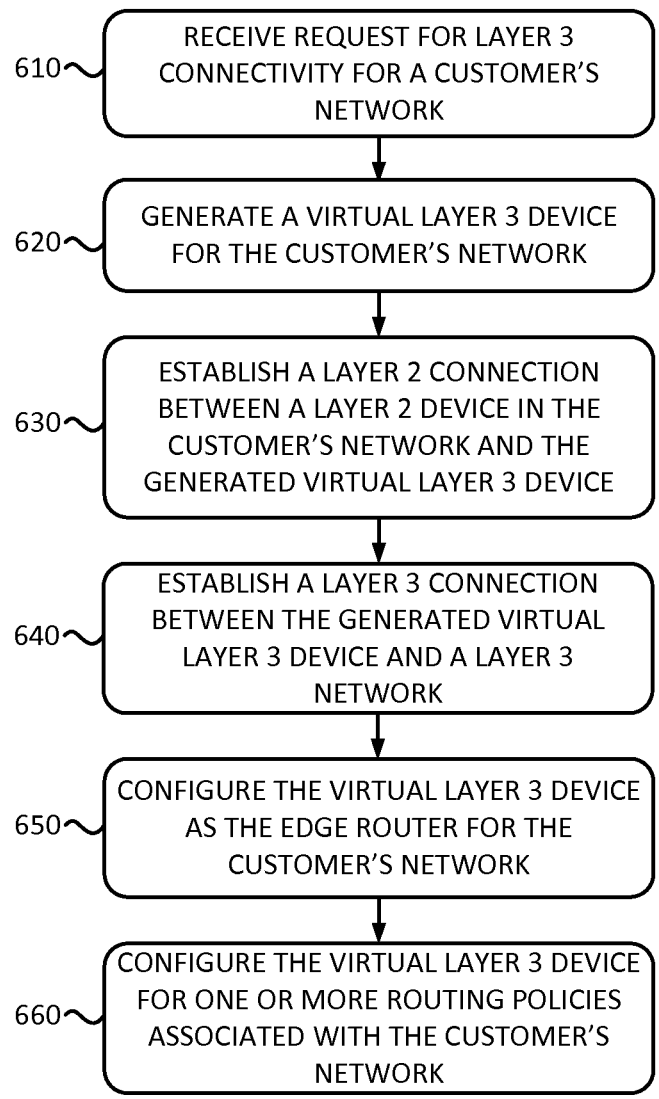
FIG. 6 is a flowchart of an exemplary process for configuring a virtual Layer 3 device for Layer 3 connectivity according to an implementation described herein.

FIG. 6 is a flowchart of an exemplary process for configuring a virtual Layer 3 device for Layer 3 connectivity according to an implementation described herein. In one implementation, the process of FIG. 6 may be performed by WAN device 145. In other implementations, some or all of the process of FIG. 6 may be performed by another device or a group of devices separate from WAN device 145 and/or including WAN device 145.

The process of FIG. 6 may include receiving a request for Layer 3 connectivity for a customer's network (block 610). For example, WAN device 145 may receive a request from customer network 105 to set up connectivity to public IP network 160 and/or private IP network 170. A virtual Layer 3 device may be generated for the customer's network (block 620). For example, virtual Layer 3 device manager 410 may generate a new virtual Layer 3 device. Virtual Layer 3 device manager 410 may create a new virtual Layer 3 device record 501 in virtual Layer 3 device memory 420. Furthermore, virtual Layer 3 device manager 410 may generate a new instance of a Layer 3 device operating system on WAN device 145 and associate the new instance of the operating system with the generated virtual Layer 3 device.

A Layer 2 connection may be established between a Layer 2 device in the customer's network and the generated virtual Layer 3 device (block 630). For example, virtual Layer 3 device manager 410 may identify a Layer 2 domain associated with the customer's network and may associate the identified Layer 2 domain with the generated virtual Layer 3 device. Furthermore, virtual Layer 3 device manager 410 may identify a Layer 2 domain tag (e.g., one or more VLAN identifiers) and an interface associated with the Layer 2 domain and may identify data units (e.g., Ethernet frames), which are received via the interface and include the identified Layer 2 domain tags, as being associated with the identified Layer 2 domain and therefore as being associated with the generated virtual Layer 3 device. In one implementation, the Layer 2 connection may correspond to Layer 2 connection 135 over provider Layer 2 network 130. In another implementation, the Layer 2 connection may be implemented over public IP network 160 via public IP tunnel 182 and/or over private IP network 170 via private IP tunnel 184.

A Layer 3 connection may be established between the generated virtual Layer 3 device and a Layer 3 network (block 640). For example, virtual Layer 3 device manager 410 may configure an interface of WAN device 145 to include one or more logical interfaces associated with the generated virtual Layer 3 device. The one or more logical interfaces may be configured to establish a Layer 3 connection to an edge router in a Layer 3 network via cloud center access system 150 (e.g., public IP connection 165 and/or private IP connection 175).

The virtual Layer 3 device may be configured as the edge router for the customer's network (block 650). For example, virtual Layer 3 device manager 410 may configure the virtual Layer 3 device as the edge router for customer network 105. Virtual Layer 3 device manager 410 may send an instruction to devices in customer network 105 to set up the virtual Layer 3 device as the default gateway. Whenever a device in customer network 105 needs to send a data unit to a device in another broadcast domain, the device may need to send the data unit to the default gateway, indicating that the data unit may now be sent to the virtual Layer 3 device.

Furthermore, routing and forwarding engine 430 may generate routing table 530 for the generated virtual Layer 3 device. Moreover, routing and forwarding engine 430 may configure the Layer 3 connection for one or more routing protocols, such as BGP. The virtual Layer 3 device may be configured for one or more routing policies associated with the customer's network (block 660). For example, virtual Layer 3 device manager 410 may obtain one or more policies associated with customer's network and may configure the generated virtual Layer 3 based on the obtained one or more policies.

Figure 7:
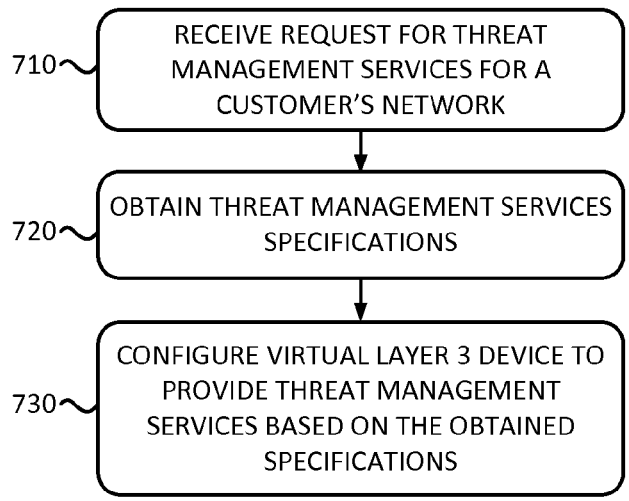
FIG. 7 is a flowchart of an exemplary process for configuring a virtual Layer 3 device for threat management services according to an implementation described herein.

FIG. 7 is a flowchart of an exemplary process for configuring a virtual Layer 3 device for threat management services according to an implementation described herein. In one implementation, the process of FIG. 7 may be performed by WAN device 145. In other implementations, some or all of the process of FIG. 7 may be performed by another device or a group of devices separate from WAN device 145 and/or including WAN device 145.

The process of FIG. 7 may include receiving a request for threat management services for a customer's network (block 710). For example, threat management engine 450 may receive a request from customer network 105 to provide one or more threat management services, such as a firewall service, an intrusion detection and prevention service, a denial of service attack detection and mitigation service, an antivirus service, a data loss prevention service, and/or a traffic reporting service.

Threat management services specifications may be obtained (block 720). For example, threat management engine 450 may receive one or more specifications for a requested threat management service. As an example, if the threat management service corresponds to a firewall, the obtained one or more specifications may include one or more firewall filter specifications. As another example, if the threat management service corresponds to a data loss prevention service, the obtained one or more specifications may include information about data patterns that are to be prevented from being sent out by customer network 105.

A virtual Layer 3 device may be configured to provide threat management services based on the obtained specifications (block 730). For example, threat management engine 450 may store the information about the requested threat management services and about the obtained specifications in threat management policies field 550 of a virtual Layer 3 record associated with the customer network 105. The stored information may be used by the virtual Layer 3 device to process data units associated with customer network 105.

Figure 8:
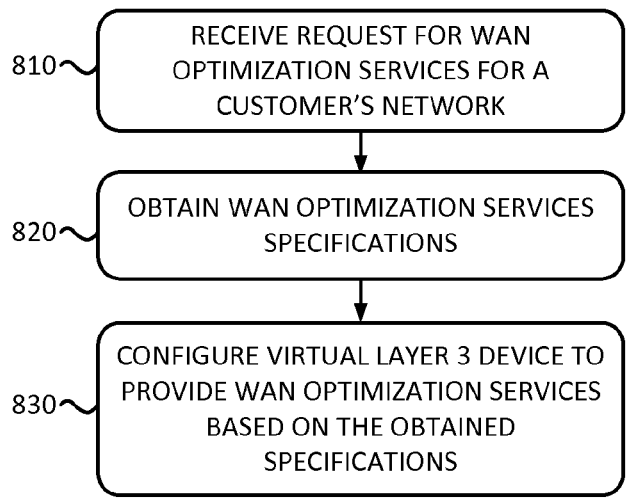
FIG. 8 is a flowchart of an exemplary process for configuring a virtual Layer 3 device for Wide Area Network (WAN) optimization according to an implementation described herein.

FIG. 8 is a flowchart of an exemplary process for configuring a virtual Layer 3 device for Wide Area Network (WAN) optimization according to an implementation described herein. In one implementation, the process of FIG. 8 may be performed by WAN device 145. In other implementations, some or all of the process of FIG. 8 may be performed by another device or a group of devices separate from WAN device 145 and/or including WAN device 145. The process of FIG. 8 may include receiving a request for WAN optimization services for a customer's network (block 810). For example, WAN optimization engine 460 may receive a request from customer network 105 to provide one or more WAN optimization services, such as a protocol spoofing service, a latency optimization service, a data deduplication service, a data compression service, and/or a traffic shaping service.

WAN optimization services specifications may be obtained (block 820). For example, WAN optimization engine 460 may receive one or more specifications for a requested WAN optimization service. As an example, if the WAN optimization service corresponds to a traffic shaping service, the obtained one or more specifications may include information about data unit classes to which the traffic shaping service is to be applied.

A virtual Layer 3 device may be configured to provide WAN optimization services based on the obtained specifications (block 830). For example, WAN optimization engine 460 may store the information about the requested WAN optimization services and about the obtained specifications in WAN optimization policies field 560 of virtual Layer 3 record associated with the customer network 105. The stored information may be used by the virtual Layer 3 device to process data units associated with customer network 105.

Figure 9:
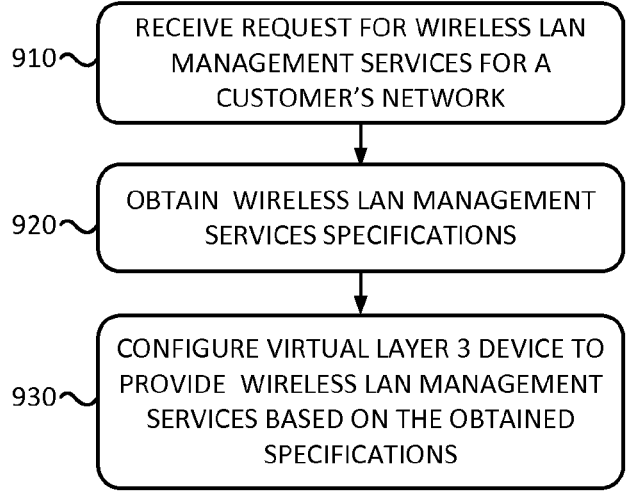
FIG. 9 is a flowchart of an exemplary process for configuring a virtual Layer 3 device for wireless Local Area Network (WAN) management according to an implementation described herein.

FIG. 9 is a flowchart of an exemplary process for configuring a virtual Layer 3 device for wireless Local Area Network (WAN) management according to an implementation described herein. In one implementation, the process of FIG. 9 may be performed by WAN device 145. In other implementations, some or all of the process of FIG. 9 may be performed by another device or a group of devices separate from WAN device 145 and/or including WAN device 145.

The process of FIG. 9 may include receiving a request for wireless LAN management services for a customer's network (block 910). For example, wireless LAN manager 470 may receive a request from customer network 105 to provide one or more wireless LAN management services, such as a wireless device security service, a wireless device data rate management service, a wireless device bandwidth management service, and/or a wireless device traffic reporting service.

Wireless LAN management services specifications may be obtained (block 920). For example, wireless LAN manager 470 may receive one or more specifications for a requested threat management service. As an example, wireless LAN manager 470 may receive information about which particular wireless devices a particular policy should be applied, information associated with authentication and authorizing particular wireless devices, information about date rate or bandwidth limits that should be applied to particular wireless devices, information about statistics that should be collected for particular wireless devices, and/or any other type of specifications that may be associated with a wireless LAN management service.

A virtual Layer 3 device may be configured to provide wireless LAN management services based on the obtained specifications (block 930). For example, wireless LAN manager 470 may store the information about the requested wireless LAN management services and about the obtained specifications in wireless LAN policies field 570 of virtual Layer 3 record associated with the customer network 105.

The stored information may be used by the virtual Layer 3 device to manage wireless devices associated with customer network 105. For example, wireless LAN manager 470 may send an instruction to a particular wireless device in customer network 105 to configure the particular wireless device based on information stored in wireless LAN policies field 570. As another example, wireless LAN manager 470 may instruct a particular wireless device in customer network 105 to send data to wireless LAN manager 470. Wireless LAN manager 470 may store data received from wireless devices in wireless LAN policies field 570 of virtual Layer 3 record associated with the customer network 105.

Figure 10:
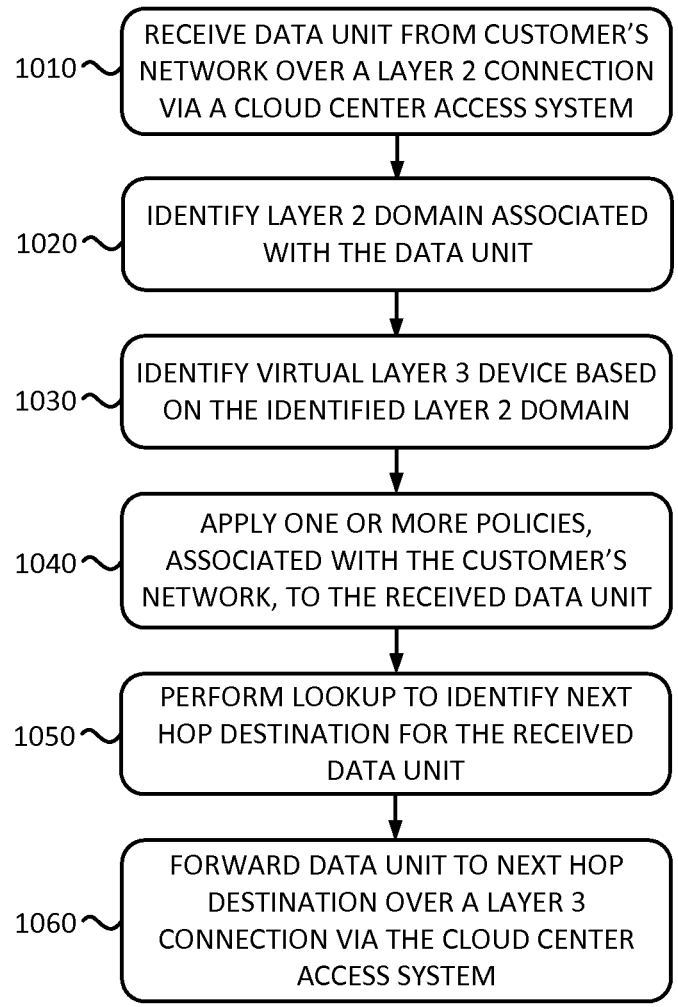
FIG. 10 is a flowchart of a first exemplary process for processing traffic according to an implementation described herein.

FIG. 10 is a flowchart of a first exemplary process for processing traffic according to an implementation described herein. In one implementation, the process of FIG. 10 may be performed by WAN device 145. In other implementations, some or all of the process of FIG. 10 may be performed by another device or a group of devices separate from WAN device 145 and/or including WAN device 145.

The process of FIG. 10 may include receiving a data unit from a customer's network over a Layer 2 connection via a cloud center access system (block 1010). For example, assume a device in customer network 105 needs to send a packet to a device associated with a particular IP address. The device may generate an IP packet, may encapsulate the IP packet in an Ethernet frame, and may send the Ethernet frame to the default gateway, the default gateway for customer network 105 being a virtual Layer 3 device defined on WAN device 145. WAN device 145 may receive the Ethernet frame from customer network 105 via cloud center access system 150 and may retrieve the IP packet from the receive Ethernet frame.

A Layer 2 domain associated with the data unit may be identified (block 1020). For example, routing and forwarding engine 430 may identify an interface and a Layer 2 domain tag associated with the received Ethernet frame and may identify the Layer 2 domain based on the identified interface and the identified Layer 2 domain tag. A virtual Layer 3 device may be identified based on the identified Layer 2 domain (block 1030). For example, routing and forwarding engine 430 may identify a virtual Layer 3 device record 501 associated with the identified Layer 2 domain. In another implementation, the virtual Layer 3 device may be identified based on a source IP address associated with the retrieved IP packet, by identifying the virtual Layer 3 device associated with the source IP address in virtual Layer 3 device table 440.

One or more policies, associated with the customer's network, may be applied to the received data unit (block 1040). For example, one or more of a routing policy, a threat management policy, and/or a WAN optimization policy may be applied to the IP packet retrieved from the Ethernet frame based on information stored in virtual Layer 3 device record 501.

A lookup may be performed to identify a next hop destination for the data unit (block 1050). For example, routing and forwarding engine 430 may access routing table 530 of the identified virtual Layer 3 device and may determine a next hop destination associated with the destination IP address of the retrieved IP packet. The data unit may be forwarded to the next hop destination over a Layer 3 connection via the cloud center access system (block 1060). For example, routing and forwarding engine 430 may forward the IP packet via a logical interface associated with the determined next hop destination. If a destination is not found in the routing and/or forwarding table, the IP packet may be sent via a default route defined in the routing and/or forwarding table.

Figure 11:
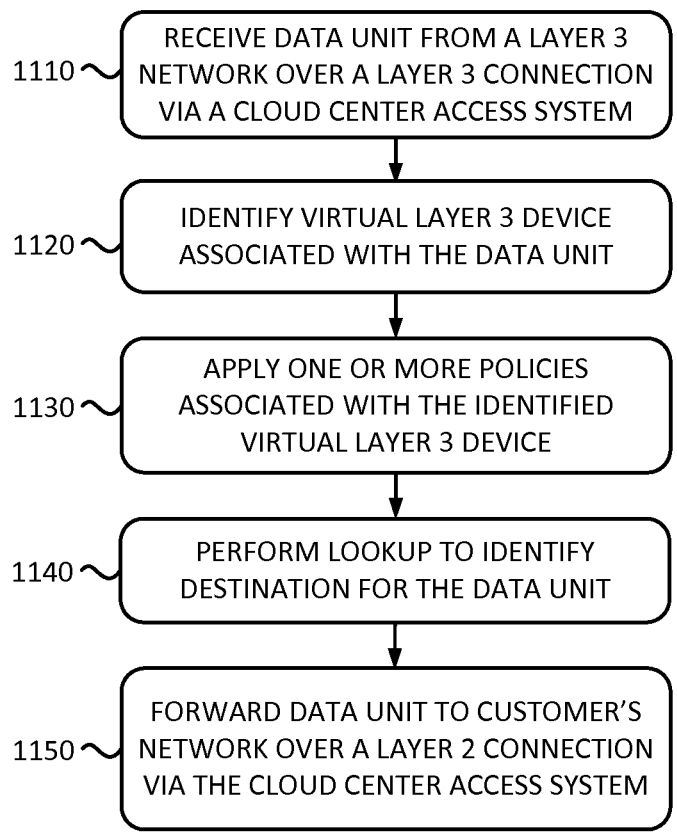
FIG. 11 is a flowchart of a second exemplary process for processing traffic according to an implementation described herein.

FIG. 11 is a flowchart of a second exemplary process for processing traffic according to an implementation described herein. In one implementation, the process of FIG. 11 may be performed by WAN device 145. In other implementations, some or all of the process of FIG. 11 may be performed by another device or a group of devices separate from WAN device 145 and/or including WAN device 145.

The process of FIG. 11 may include receiving a data unit from a Layer 3 network over a Layer 3 connection via a cloud center access system (block 1110). For example, WAN device 145 may receive an IP packet from public IP network 160 via public IP connection 165 or from private IP network 170 via private IP connection 175. A virtual Layer 3 device associated with the data unit may be identified (block 1120). For example, the virtual Layer 3 device may be identified based on a destination IP address associated with the received IP packet, by identifying the virtual Layer 3 device associated with the destination IP address in virtual Layer 3 device table 440.

One or more policies associated with the identified virtual Layer 3 device may be applied (block 1130). For example, one or more of a routing policy, a threat management policy, and/or a WAN optimization policy may be applied to the received IP packet based on information stored in virtual Layer 3 device record 501 associated with the identified virtual Layer 3 device.

A lookup may be performed to identify a destination for the data unit (block 1140). For example, routing and forwarding engine 430 may access routing table 530 associated with the identified virtual Layer 3 device and may identify a destination device associated with the destination IP address. The destination device may be reachable, for example, via Layer 2 device 120.

The data unit may be forwarded to the customer's network over a Layer 2 connection via the cloud center access system (block 1150). For example, routing and forwarding engine 430 may generate an Ethernet frame with a destination MAC address associated with the identified destination and may forward the Ethernet frame via an output interface associated with the identified destination. If a destination for the IP packet cannot be identified in routing table 530, the identified virtual Layer 3 device may encapsulate the IP packet in an Ethernet frame and may flood the Ethernet frame to all destinations associated with customer network 105 (e.g., to all Layer 2 devices 120 associated with customer network 105).

Figure 12:
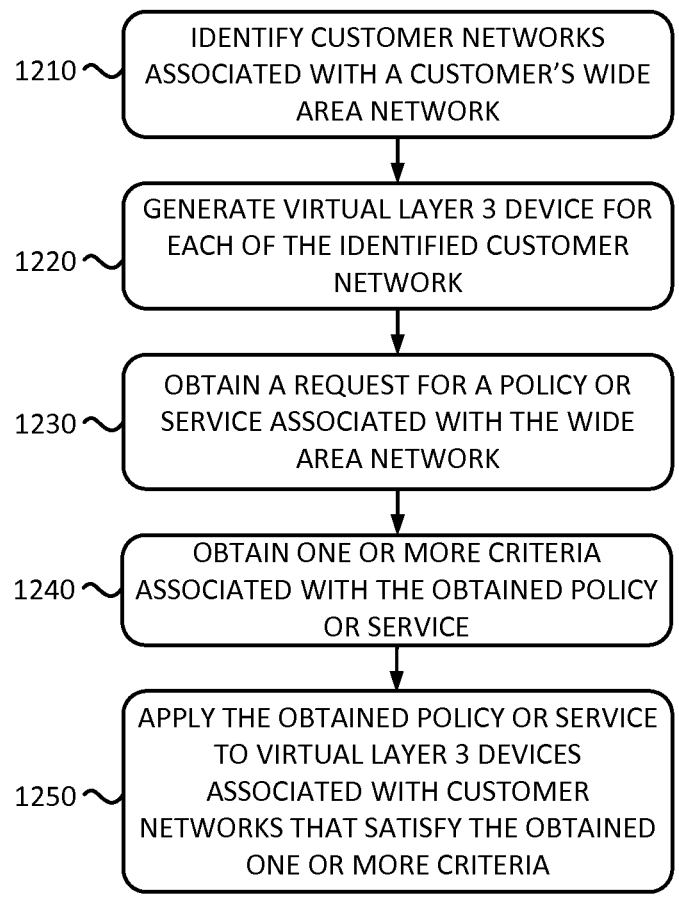
FIG. 12 is a flowchart of an exemplary process for configuring a customer's wide area network according to an implementation described herein.

FIG. 12 is a flowchart of an exemplary process for configuring a customer's wide area network according to an implementation described herein. In one implementation, the process of FIG. 12 may be performed by WAN device 145. In other implementations, some or all of the process of FIG. 12 may be performed by another device or a group of devices separate from WAN device 145 and/or including WAN device 145.

The process of FIG. 12 may include identifying customer networks associated with a customer's WAN (block 1210). For example, a customer may identify one or more customer networks 105 that are associated with the customer's WAN. As another example, WAN device 145 may identify a Layer 2 domain as being associated with a customer and may identify customer networks 105 associated with the identified Layer 2 domain.

A virtual Layer 3 device may be generated for each of the identified customer networks (block 1220). For example, virtual Layer 3 device manager 410 may generate a virtual Layer 3 device for each of the identified customer networks. A request for a policy or service, associated with the WAN, may be obtained (block 1230). For example, virtual Layer 3 device manager 410 may obtain a request to provide a policy or service to the customer's WAN. As an example, the customer may request that a particular firewall filter be applied to particular ones of the customer's networks. As another example, the customer may purchase a WAN optimization service and apply the WAN optimization service to all of the customer's networks. As yet another example, the customer may request to apply policy-based routing for packets associated with a particular application running on devices in the customer's networks. As yet another example, an existing policy or service may be selected for an update.

One or more criteria, associated with the obtained policy or service, may be obtained (block 1240). For example, virtual Layer 3 device manager 410 may obtain one or more criteria for determining to which customer networks 105 the requested service or policy should be applied. For example, a first set of customer networks may be associated with a first department (e.g., a sales department) and a second set of networks may be associated with a second department (e.g., a human resources department), and the customer may request to apply the requested policy or service to the first department without applying the requested policy or service to the second department. As another example, the customer may select to apply the request policy or network to customer networks associated with a particular type of connection (e.g., customer networks 105 that connect to cloud center access system 150 via public IP tunnel 165.

The obtained policy or service may be applied to virtual Layer 3 devices associated with customer networks that satisfy the obtained one or more criteria (block 1250). For example, virtual Layer 3 device manager 410 may identify customer networks 105 that match the one or more criteria, may identify virtual Layer 3 devices associated with the identified customer networks 105, and may configure the identified virtual Layer 3 devices to provide the requested policy or service. Thus, the process of FIG. 12 may enable a customer to configure routing, threat management, WAN optimization, and/or wireless LAN management for multiple networks in the customer's WAN without having to configure each network individually. Moreover, the customer may configure multiple networks without having to purchase separate hardware for each network. Moreover, the configurations may be updated without having to individually update configurations for particular networks or without having to purchase new equipment.

Figure 13:
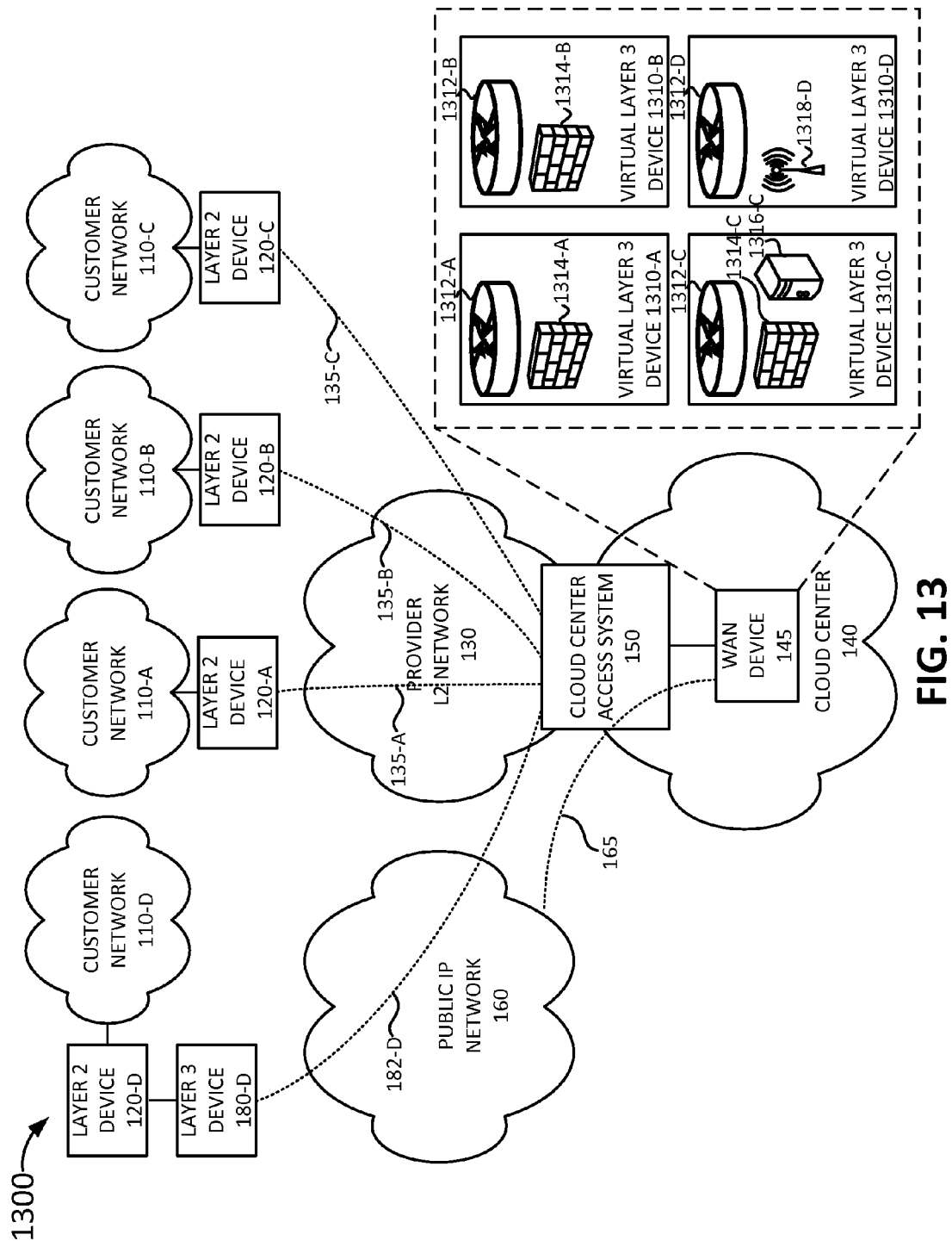
FIG. 13 is a diagram of a first example that illustrates aspects of an implementation described herein.

FIG. 13 is a diagram of a first example 1300 that illustrates aspects of an implementation described herein. Example 1300 illustrates a customer's WAN that includes four networks: customer network 110-A, customer network 110-B, customer network 110-C, and customer network 110-D. Customer network 110-A may be connected to cloud center 140 via provider Layer 2 network 130 using Layer 2 connection 135-A. Customer network 110-B may be connected to cloud center 140 via provider Layer 2 network 130 using Layer 2 connection 135-B. Customer network 110-C may be connected to cloud center 140 via provider Layer 2 network 130 using Layer 2 connection 135-C. Customer network 110-D may be connected to cloud center 140 via a Layer 2 connection implemented using a Layer 3 public IP tunnel 182-D over public IP network 160.

WAN device 145 in cloud center 140 may include a virtual Layer 3 device associated with each of the four networks. WAN device 145 may include a virtual Layer 3 device 1310-A associated with customer network 110-A, a virtual Layer 3 device 1310-B associated with customer network 110-B, a virtual Layer 3 device 1310-C associated with customer network 110-C, and a virtual Layer 3 device 1310-D associated with customer network 110-D.

Virtual Layer 3 device 1310-A may include an edge router 1312-A and a firewall 1314-A. Edge router 1312-A may perform the functions of an edge router for customer network 110-A. Firewall 1314-A may perform the functions of a firewall for customer network 110-A. Similarly, virtual Layer 3 device 1310-B may include an edge router 1312-B and a firewall 1314-B. Edge router 1312-B may perform the functions of an edge router for customer network 110-B and firewall 1314-B may perform the functions of a firewall for customer network 110-B.

Virtual Layer 3 device 1310-C may include an edge router 1312-C, a firewall 1314-C, and a virtual WAN optimization device 1316-C. Edge router 1312-C may perform the functions of an edge router for customer network 110-C and firewall 1314-C may perform the functions of a firewall for customer network 110-C. Virtual WAN optimization device 1316-C may perform WAN optimization services for customer network 110-C. Virtual Layer 3 device 1310-D may include an edge router 1312-D and a virtual wireless LAN management device 1318-D. Edge router 1312-D may perform the functions of an edge router for customer network 110-D. Wireless LAN management device 1318-D may perform wireless LAN management services for customer network 110-D.

Figure 14:
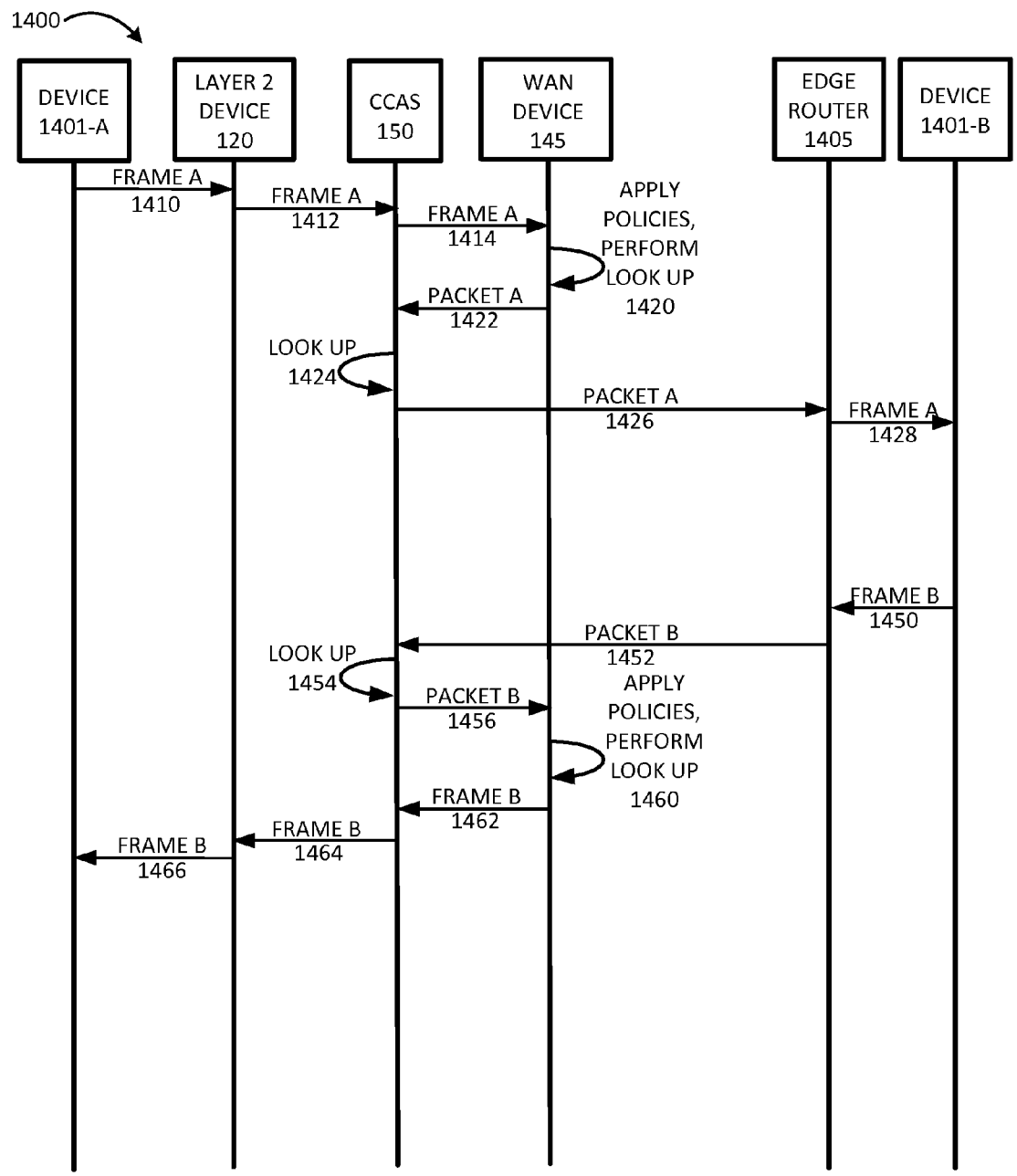
FIG. 14 is a diagram of a second example that illustrates aspects of an implementation described herein.

FIG. 14 is a diagram of a second example 1400 that illustrates aspects of an implementation described herein. Example 1400 illustrates an example flow of a data unit through environment 100. Device 1401-A and device 1401-B may correspond to, for example, server devices. Device 1401-A may be located in customer network 105 and device 1401-B may be located in public IP network 160. Device 1401-A may need to communicate with device 1401-B and may select to send an IP packet to device 1401-B. Device 1401-A may determine the IP address of device 1401-B and may generate an IP packet that includes the IP address of device 1401-A as the source IP address and the IP address of device 1401-B as the destination IP address.

Since device 1401-B is on a different broadcast domain, device 1401-A may need to send the IP packet to the default gateway. The default gateway of device 1401-A may be configured as a virtual Layer 3 device residing in WAN device 145. Device 1401-A may include the IP packet in an Ethernet frame with a destination MAC address associated with the virtual Layer 3 device and may send the Ethernet frame to Layer 2 device 120 (signal 1410). The Ethernet frame may include a particular Layer 2 domain tag associated with a Layer 2 domain associated with customer network 105. Layer 2 device 120 may forward the Ethernet frame to cloud center access system (CCAS) 150 (signal 1412) and cloud center access system 150 may forward the Ethernet frame to WAN device 145 (signal 1414).

WAN device 145 may determine an interface and a Layer 2 domain tag associated with the received Ethernet frame, may determine a Layer 2 domain associated with the Ethernet frame, and may determine a virtual Layer 3 device associated with the identified Layer 2 domain. WAN device 145 may retrieve the IP packet from the Ethernet frame, may process the IP packet based on policies associated with the virtual Layer 3 device, and may perform a next hop destination lookup on the IP packet (item 1420). For example, WAN device 145 may apply a firewall policy and/or a WAN optimization policy to the IP packet. Assuming that the applied policies allow the packet to be forwarded, the packet may be forward to cloud center access system 150 (signal 1422). Cloud center access system 150 may now act as a Layer 3 device with respect to the received IP packet and may perform a next hop destination lookup for the IP packet (item 1424). The IP packet may be forwarded to a router in public IP network 160 (not shown in FIG. 14) and may continue to be forwarded until the IP packet reached edge router 1405 associated with device 1401-B (signal 1426). Edge router 1405 may forward the IP packet to device 1401-B in an Ethernet frame (signal 1428).

Device 1401-B may select to send a packet back to device 1401-A via an Ethernet frame (signal 1450). Edge router 1405 may receive the Ethernet frame, retrieve the IP packet, and send the IP packet to a next hop destination router in public IP network 160 (not shown in FIG. 14). The IP packet may be forwarded via routers in public IP network 160 and may eventually reach cloud center access system 150 (signal 1452). Cloud center access system 150 may perform a lookup on the IP packet and may determine, based on the IP destination address of the received IP packet, that the next hop destination corresponds to WAN device 145 (item 1454). Cloud center access system 150 may forward the IP packet to WAN device 145 (signal 1456). WAN device 145 may identify a virtual Layer 3 device for the IP packet based on the destination IP address, by, for example, accessing virtual Layer 3 device table 440.

WAN device 145 may, via the identified virtual Layer 3 device, apply one or more policies to the received IP packet and may perform a lookup to determine a destination associated with the IP packet (item 1460). Since the determined destination is on the same broadcast domain as the final destination of the IP packet (based on the destination IP address of the IP packet), and assuming the packet is allowed to be forwarded based on the applied policies WAN device 145 may generate an Ethernet frame with a destination MAC address corresponding to the MAC address of device 1401-A. The Ethernet frame may include a Layer 2 domain tag associated with the Layer 2 domain associated with customer network 105 in which device 1401-A resides.

The Ethernet frame may now be forward to device 1401-A over a Layer 2 connection via cloud center access system 150 (item 1462). Cloud center access system 150 may identify a Layer 2 domain associated with the Ethernet frame and may perform a lookup in a forwarding table associated with the identified Layer 2 domain. The next destination may be determined to be Layer 2 device 120 and cloud center access system 150 may forward the Ethernet frame to Layer 2 device 120 (signal 1464). Layer 2 device 120 may lookup the destination MAC address of the Ethernet frame in a forwarding table and may forward the Ethernet frame to device 1401-A (signal 1466). Device 1401-A may retrieve the IP packet from device 1401-B from the received Ethernet frame.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 6-12, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method performed by a network device, the method comprising:
    generating, by the network device, a virtual Layer 3 device for a customer's network;
    establishing, by the network device, a Layer 2 connection between the customer's network and the generated virtual Layer 3 device;
    establishing, by the network device, a Layer 3 connection between the generated virtual Layer 3 device and a Layer 3 network;
    configuring, by the network device, the generated virtual Layer 3 device to function as an edge router for the customer's network; and
    configuring, by the network device, the generated virtual Layer 3 device for one or more services, wherein the one or more services include at least one of:
    one or more threat management services,
    one or more wide area network optimization services, or
    one or more wireless local area network management services.

2. The method of claim 1, wherein generating the virtual Layer 3 device includes:
    generating an instance of an operating system for the virtual Layer 3 device.

3. The method of claim 1, wherein configuring the generated virtual Layer 3 device to function as an edge router for the customer's network includes:
    generating a routing table for the generated virtual Layer 3 device.

4. The method of claim 1, wherein configuring the generated virtual Layer 3 device for one or more services further includes:
    configuring the generated virtual Layer 3 device to run Border Gateway Protocol.

5. The method of claim 1, wherein configuring the generated virtual Layer 3 device to function as an edge router for the customer's network includes:
    generating one or more routing policies for the generated virtual Layer 3 device.

6. The method of claim 1, further comprising:
    receiving a request to provide the one or more threat management services for the customer's network; and
    wherein configuring the generated virtual Layer 3 device for one or more services includes:
    configuring the generated virtual Layer 3 device to provide the one or more threat management services, in response to receiving the request.

7. The method of claim 6, wherein the one or more threat management services include a firewall service.

8. The method of claim 6, wherein the one or more threat management services include one or more of:
    an intrusion detection and prevention service;
    a denial of service attack detection and mitigation service;
    an antivirus service;
    a data loss prevention service; or
    a traffic reporting service.

9. The method of claim 1, further comprising:
    receiving a request to provide the one or more wide area network optimization services for the customer's network; and
    wherein configuring the generated virtual Layer 3 device for one or more services includes:
    configuring the generated virtual Layer 3 device to provide the one or more wide area network optimization services, in response to receiving the request.

10. The method of claim 9, wherein the one or more wide area network optimization services include one or more of:
    a protocol spoofing service;
    a latency optimization service;
    a data deduplication service;
    a data compression service; or
    a traffic shaping service.

11. The method of claim 1, further comprising:
    receiving a request to provide the one or more wireless local area network management services for the customer's network; and
    wherein configuring the generated virtual Layer 3 device for one or more services includes:
    configuring the generated virtual Layer 3 device to provide the one or more wireless local area network management services, in response to receiving the request.

12. The method of claim 11, wherein the one or more wireless local area network management services include one or more of:
    wireless device security service;
    wireless device data rate management service;
    wireless device bandwidth management service; or
    wireless device traffic reporting service.

13. The method of claim 1, further comprising:
    receiving a data unit from the customer's network via the Layer 2 connection;
    identifying a Layer 2 domain associated with the data unit;
    identifying the generated virtual Layer 3 device as being associated with the data unit based on the identified Layer 2 domain;
    identifying a next hop destination for the received data unit based on a routing table associated with the generated virtual Layer 3 device; and
    sending the data unit to the identified next hop destination.

14. The method of claim 13, further comprising:
    applying one or more routing policies, associated with the generated virtual Layer 3 device, to the received data unit.

15. The method of claim 13, further comprising:
    applying the one or more threat management policies, associated with the generated virtual Layer 3 device, to the received data unit.

16. The method of claim 13, further comprising:
    applying the one or more wide area network optimization policies, associated with the generated virtual Layer 3 device, to the received data unit.

17. The method of claim 1, further comprising:
generating a plurality of virtual Layer 3 devices for a plurality of customer networks associated with a customer; and
configuring the plurality of virtual Layer 3 devices with at least one of a same policy or a same service.

18. A device comprising:
logic configured to:
generate a virtual Layer 3 device for a customer's network;
establish a Layer 2 connection between the customer's network and the generated virtual Layer 3;
establish a Layer 3 connection between the generated virtual Layer 3 device and a Layer 3 network;
configure the generated virtual Layer 3 device to function as an edge router for the customer's network; and
configure the generated virtual Layer 3 device for one or more services, wherein the one or more services include at least one of one or more threat management services, one or more wide area network optimization services, or one or more wireless local area network management services.

19. The device of claim 18, wherein the logic is further configured to:
generate an instance of an operating system for the virtual Layer 3 device;
generate a routing table for the generated virtual Layer 3 device; and
wherein the logic to configure the generated virtual Layer 3 device for one or more services is further configured to:
configure the generated virtual Layer 3 device to run Border Gateway Protocol.

20. The device of claim 18, wherein the logic to configure the generated virtual Layer 3 device for one or more services is further configured to:
configure the generated virtual Layer 3 device to provide the one or more threat management services, wherein the one or more threat management services include one or more of:
a firewall service;
an intrusion detection and prevention service;
a denial of service attack detection and mitigation service;
an antivirus service;
a data loss prevention service; or
a traffic reporting service.

21. The device of claim 18, wherein the logic to configure the generated virtual Layer 3 device for one or more services is further configured to:
configure the generated virtual Layer 3 device to provide the one or more wide area network optimization services, wherein the one or more wide area network optimization services include one or more of:
a protocol spoofing service;
a latency optimization service;
a data deduplication service;
a data compression service; or
a traffic shaping service.

22. The device of claim 18, wherein the logic to configure the generated virtual Layer 3 device for one or more services is further configured to:
configure the generated virtual Layer 3 device to provide the one or more wireless local area network management services, wherein the one or more wide area network optimization services include one or more of:
wireless device security service;
wireless device data rate management service;
wireless device bandwidth management service; or
wireless device traffic reporting service.

23. The device of claim 18, wherein the logic is further configured to:
receive a data unit from the customer's network via the Layer 2 connection;
identify a Layer 2 domain associated with the data unit;
identify the generated virtual Layer 3 device as being associated with the data unit based on the identified Layer 2 domain;
identify a next hop destination for the received data unit based on a routing table associated with the generated virtual Layer 3 device; and
send the data unit to the identified next hop destination.

24. The device of claim 18, wherein the logic is further configured to:
generate a plurality of virtual Layer 3 devices for a plurality of customer networks associated with a customer; and
configure the plurality of virtual Layer 3 devices with at least one of a same policy or a same service.

25. A cloud center system comprising:
a cloud center access device configured to:
provide Layer 2 connections to a plurality of customer networks,
maintain separation of traffic associated with different ones of the plurality of customer networks, and
provide at least one Layer 3 connection to a Layer 3 network; and
a wide area network device, connected to the cloud center access device over a Layer 2 connection, the wide area network device configured to:
generate a plurality of virtual Layer 3 devices for the plurality of customer networks, wherein a particular one of the plurality of virtual Layer 3 devices functions as an edge router with respect to the Layer 3 network for a particular one of the plurality of customer networks; and
configure a particular one of the plurality of virtual Layer 3 devices for one or more services, wherein the one or more services include at least one of one or more threat management services, one or more wide area network optimization services, or one or more wireless local area network management services.

26. The cloud center system of claim 25, wherein at least one of the Layer 2 connections to the plurality of customer networks is implemented via a tunnel across an Internet Protocol network.

27. The cloud center system of claim 25, wherein the wide area network device is further configured to:
generate instances of an operating system for the plurality of virtual Layer 3 devices;
generate routing tables for the plurality of virtual Layer 3 devices; or
configure the plurality of virtual Layer 3 devices to run Border Gateway Protocol.

28. The cloud center system of claim 25, wherein the wide area network device is further configured to:
configure the plurality of virtual Layer 3 devices with at least one of a same policy or a same service.

* * * * *